United States Patent [19]

Hanmura et al.

[11] 4,023,135
[45] May 10, 1977

[54] APPARATUS FOR DETECTING THE NUMBER OF OBJECTS

[75] Inventors: Hisao Hanmura, Hitachi; Nobuo Satou, Iwaki; Shigeyoshi Kawano, Hitachiota; Tatsuo Iwasaka; Hiroshi Kinoshita, both of Katsuta, all of Japan

[73] Assignee: Hitachi, Ltd., Japan

[22] Filed: Sept. 15, 1975

[21] Appl. No.: 613,500

[30] Foreign Application Priority Data

Sept. 20, 1974 Japan .................. 49-107744

[52] U.S. Cl. .................. 340/1 R; 340/1 C
[51] Int. Cl.[2] .................. G01S 9/66
[58] Field of Search .................. 340/1 C, 1 R, 1 T

[56] References Cited

UNITED STATES PATENTS 3,341,848  9/1967  Niediek .................. 340/1 R
3,416,127  12/1968  Menin et al. .................. 340/1 C
3,474,400  10/1969  Aver, Jr. et al. .................. 340/1 R Primary Examiner—Richard A. Farley
Attorney, Agent, or Firm—Craig & Antonelli

[57] ABSTRACT

Apparatus for detecting the number of objects such as the number of persons located within a predetermined area. Ultrasonic wave is emitted toward the objects, the number of which is to be determined, and the reflected waves from the objects are received by a receiver. Among the received reflection waves, the waves having an amplitude greater than a predetermined peak value are derived as the useful reflection wave signal having a constant peak value. The number of the objects is determined based on the quantity of the derived reflection wave signals having the constant peak value. By emitting the ultrasonic wave for every unit time, the derived reflection wave signals having the constant peak value may be averaged by means of a smoothing circuit.

11 Claims, 13 Drawing Figures

APPARATUS FOR DETECTING THE NUMBER OF OBJECTS

The present invention relates to an apparatus for detecting the number of objects, such as the number of persons, located within a predetermined area or region.

As the objects the number of which is to be detected, the number of persons or passengers who are present at predetermined locations or places, such as an underground street a, platform of a station, an elevator hall or the like is often required to be determined.

For example, in the case of an elevator system, a group control has lately been developed with a view to improving the operating efficiency of the elevator system and enhancing the services to the passengers. To this end, a control procedure in which the number of passengers awaiting in the elevator hall is taken into consideration as traffic information. In order to accomplish such control, it is necessary to determine the number of waiting passengers with a high accuracy.

As an apparatus for detecting persons or the like objects existing in a predetermined area as above described, a burglar alarm type apparatus has been hithertofore known in which the disturbance of emitted electromagnetic or ultrasonic waves by an person in the area is utilized for the actuation of the alarm. Such apparatus is, however, adapted for a mere detection of the presence or absence of persons and is incapable of detecting the number of the persons in the area. Further, a system for detecting a school of fish is also known. This system, however, merely allows a rough determination of the abundance of fish in the school with the aid of visual observation of the received reflection signal based on the area occupied by the fish. It is impossible to detect the number of fish, not to speak of automatic determination of an exact number. Furthermore, a mat switch apparatus is known in which a plurality of individual switches are arranged to monitor each of several allotted areas available for a person to occupy. By detecting the number of the switches actuated, it is certainly possible to determine the number of persons standing at such areas. However, a large space as well as the supporting structure is required for the installation of the mat switch. Besides, owing to the specific structure of such a switch array, it may happen that a particular situation will make the installation of the switch apparatus impractical or unsuitable.

In the light of the foregoing technical background, there is a great demand for an apparatus which can detect or determine the number of concerned objects, such as, passengers in a certain area.

Accordingly, an object of the present invention is to provide an apparatus for detecting the number of objects in an area, which apparatus can be constructed inexpensively in a simplified manner and is substantially immune to spatial restrictions.

Another object of the invention is to provide an apparatus which allows the detection of the number of objects in an area with a high accuracy.

According to one aspect of the invention, an ultrasonic wave transmitter-receiver unit, which is generally unrestricted as to the mounting place thereof, is employed to emit an ultrasonic wave toward the objects. Among the reflection waves from the objects, waves having a peak value greater than a predetermined level are derived with the peak value thereof maintained constant. Detection of the number of objects is made on the basis of the quantity of the reflected wave signals having a constant peak value. With such arrangement of the detection system, the number of the concerned objects, such as passengers for an elevator, can be positively determined without being influenced by the locations of the objects or possible noise.

According to another aspect of the invention, the reflected wave signals of a constant peak value are derived by emitting an ultrasonic wave during every given unit time and averaging the received waves, thereby to detect the number of the objects without being adversely influenced by any possible movements of the objects. By extracting only those reflection waves which are received during a predetermined time interval or period after the emission of the ultrasonic wave, any interference by objects located outside the predetermined detection area can be excluded from the detecting operation. Additionally, according to the invention, the wave form of the received reflection wave signals is shaped so as to enhance the detection accuracy of the apparatus.

The above and other objects, features and advantages of the invention will become more apparent by examining the description of exemplary embodiments of the invention, referring to the accompanying drawings, in which.

Figure 5:
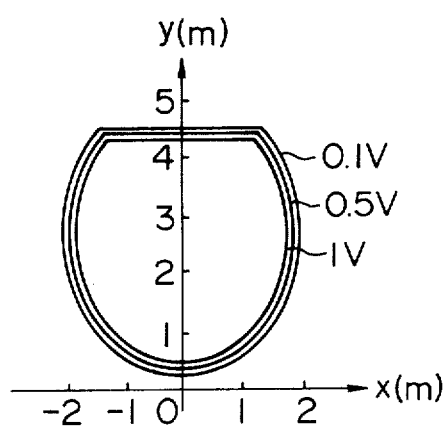
Figure 6:
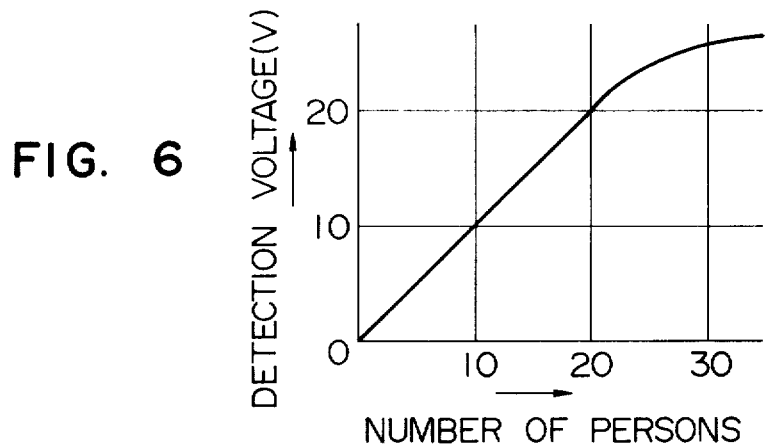
Figure 7:
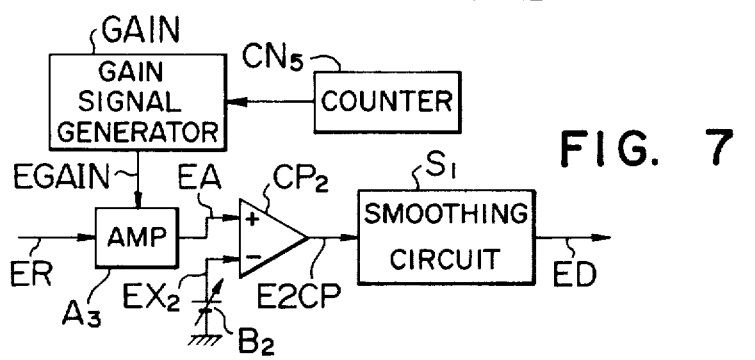
Figure 8:
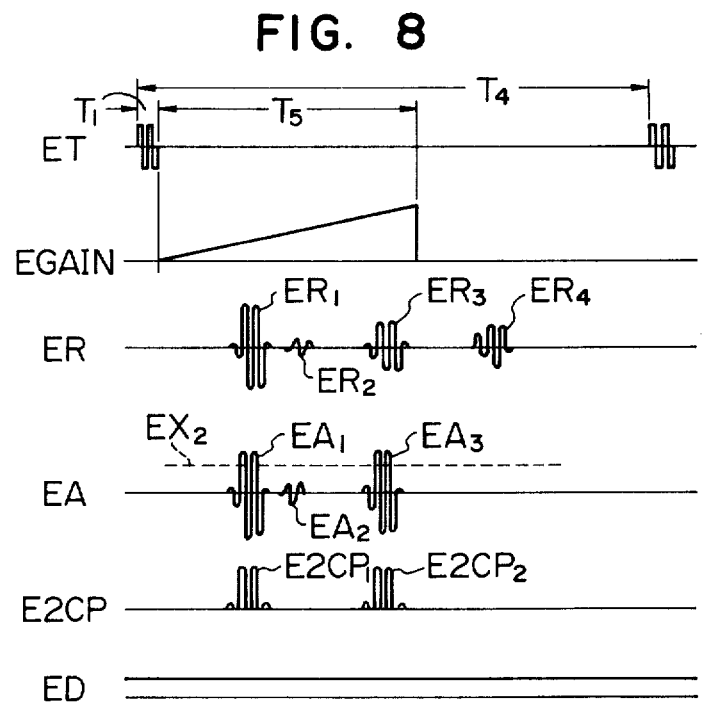
Figure 9:
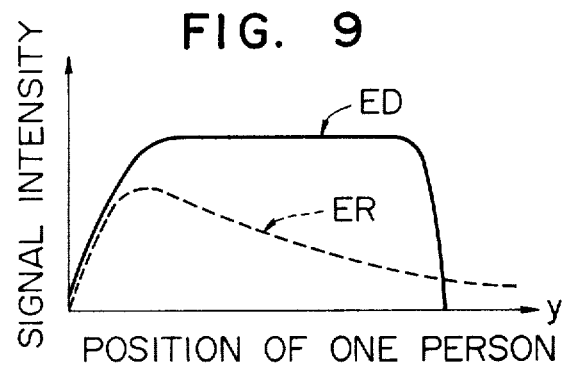
Figure 10:
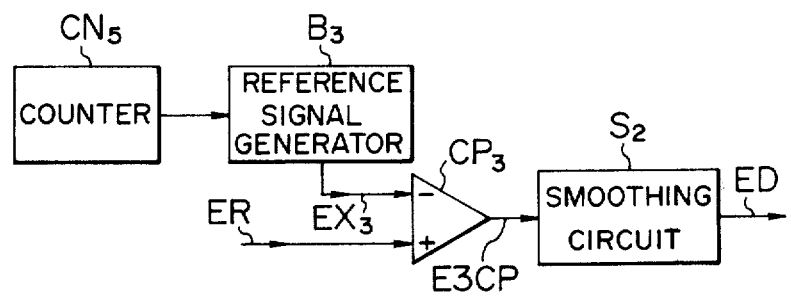
Figure 11:
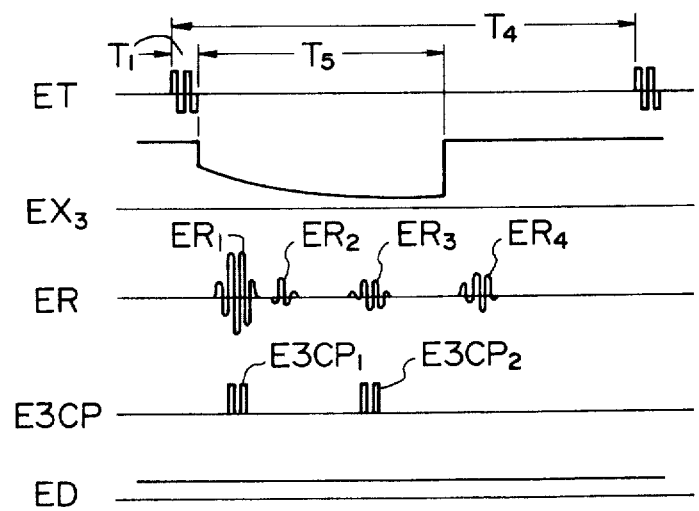
Figure 12:
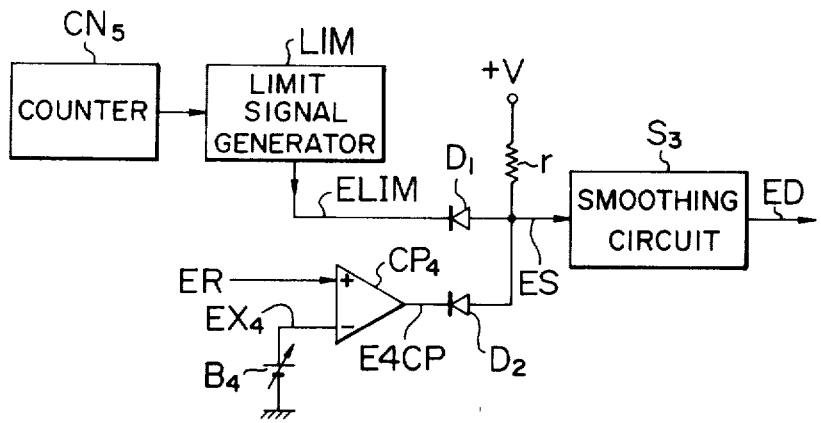
Figure 13:
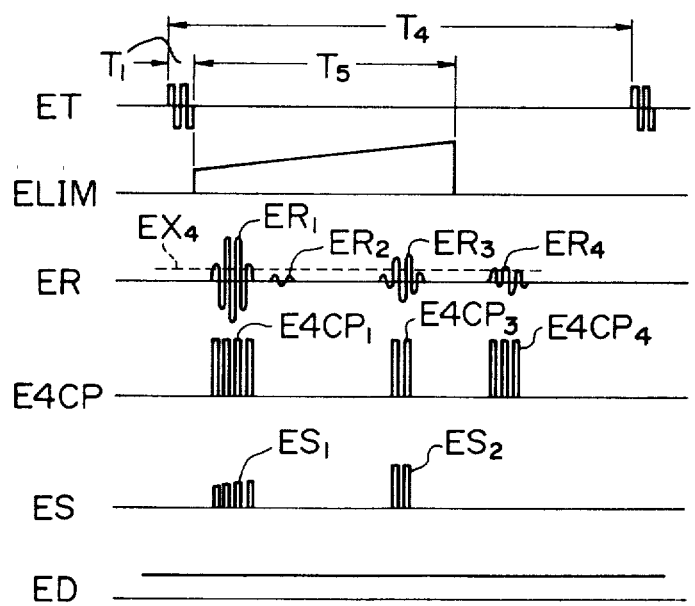

FIG. 5 graphically shows the characteristic of the received reflection wave signal processed by the number detecting apparatus according to the invention;

FIG. 6 shows graphically the detection characteristic of the number detecting apparatus according to the invention;

FIG. 7 is a schematic circuit diagram showing the a modification of the number detecting apparatus according to the invention;

FIG. 8 is a signal wave diagram to illustrate the operation of the apparatus shown in FIG. 7;

FIG. 9 shows a characteristic of the number detecting signal produced according to the teaching of the invention;

FIG. 10 is a schematic circuit diagram showing a main portion of another embodiment of the number detecting apparatus according to the invention;

FIG. 11 is a signal wave diagram to illustrate the operation of the the apparatus shown in FIG. 10;

FIG. 12 of the person will be eliminated from a still further embodiment of the number detecting apparatus according to the invention; and FIG. 13 is a signal wave diagram to illustrate the operation of the apparatus shown in FIG. 12.

Now, the invention will be described by referring to the accompanying drawings which show preferred embodiments of the invention and illustrate the principle and the operations thereof. In the following description, it is assumed for convenience sake that the invention is applied to the detection of the number of passengers waiting for an elevator cage at an elevator floor hall.

Figure 1:
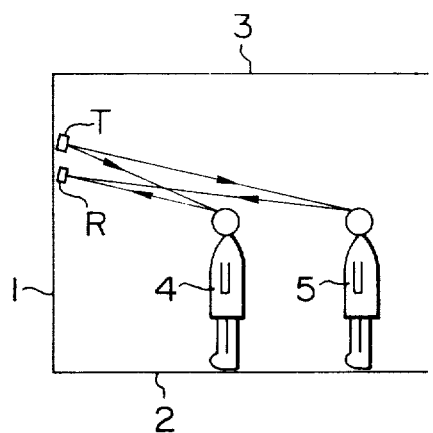
FIG. 1 shows schematically an arrangement of an ultrasonic transmitter and receiver disposed at an elevator hall.

FIG. 1 schematically shows an arrangement of an ultrasonic transmitter or emitter T and an ultrasonic receiver R disposed in an elevator floor hall. It will be readily appreciated that the transmitter T mounted on a wall 1 at an upper portion emits an ultrasonic pulse signal which is reflected by passengers 4 and 5 standing at the floor 2. The reflected ultrasonic wave is then received by the receiver R mounted also on the wall 1, whereby a received wave signal RE is produced from the output of the receiver R.

With such arrangement of the system for detecting the number of passengers, it has been hithertofore considered to be difficult and troublesome to detect the passenger number positively and accurately, because the received wave signal ER is inevitably subjected to fluctuations due to naturally variable postures and locations of the passengers. In the following description this difficulty will be elucidated more concretely, which will contribute to a better understanding of the principle of the invention for solving the imposed problems.

The remarkable variation in the received wave signal ER depending on the postures taken by the passengers can be ascribed to the fact that the reflection of the ultrasonic wave from the passengers is by no means a uniformly diffused reflection. In other words, the amplitude of the reflected waves varies in dependence upon the directions of reflection, which in turn is varied by the posture of the reflecting passenger. Accordingly, there are differences in the magnitude of the ultrasonic wave reflected from one and the same person depending on the posture which he may have. Reception of the reflected wave having a greater magnitude will of course result in a high output signal ER from the receiver R and vice versa. Considering the fact that the posture of the passenger is likely to vary constantly, it will be self-explanatory that the received wave signal ER is extremely unstable. Experiments have shown that, even if a person stands up stationally in a natural posture, the corporeal portions of his body are always producing fine motions, which also incurs corresponding variations in the received wave signal ER. It has, however, been found that a considerably stabilized signal ER can be obtained by averaging these variations over a period of several seconds. Further, it has also been observed that the averaged values are proportional to the numbers of the passengers within a good tolerance. In particular, the variations in the received wave signal ER caused by the fine motions as described above can be substantially suppressed by the averaging operation. The invention thus contemplates to solve the one problem by averaging the received wave signal ER over a period of several seconds (for example, five seconds) which is longer than the period of the fine corporeal motions. Additionally, the averaging principle according to the invention will bring about the auxiliary advantage that the influence of the ultrasonic wave disturbed for some reason, such as wind, in an undesirable direction or the like can be eliminated. It is to be added that the stability of the received wave signal ER can be further enhanced by the methods described hereinafter.

Next, the relation between the position or location of the passenger and the received reflection signal ER will be described. For the convenience of explanation, the variation of the signal ER due to the varying posture of the person will be eliminated from consideration.

Figure 2:
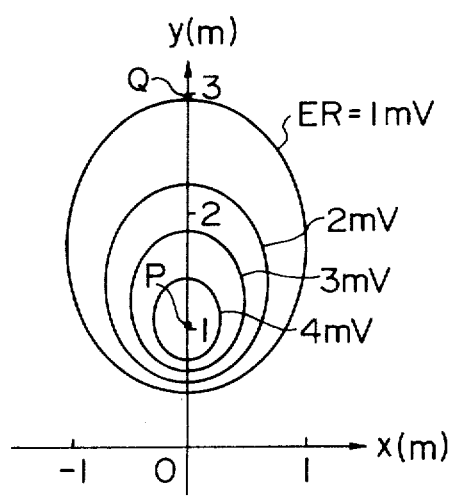
FIG. 2 shows graphically the characteristic of the reflection wave signal produced by an ultrasonic wave receiver.

FIG. 2 shows graphically the characteristic of the reflection wave signal ER as received by the receiver R disposed in the arrangement shown in FIG. 1. It is assumed that the transmitter T and the receiver R (the both will hereinafter be referred to as the transmitter-receiver unit) are disposed at the origin 0 and directed along the Y-axis. Owing to the directivity of the employed transmitter-receiver unit, the magnitude of the received signal ER from the reflection at the coordinate point P ($x = 0$ m and $y = 1$ m) was at maximum and the output voltage of about 4.5 mV could be obtained from the receiver R. The magnitude of the received signal ER decreases rapidly, as the reflecting point is moved peripherally from the point P. For example, at the coordinate Q ($x = 0$ m and $y = 3$ m), the magnitude of the received wave signal output decreased to the level of 1 mV. In this connection, it will be understood that the variations in the received wave signal along the Y-axis are also ascribable to the variation in the distance between the transmitter-receiver unit and the refelection points in addition to the directivity of the same unit.

When only the presence or absence of the passenger is to be detected as in the case of the conventional detection system, the received wave signals subjected to the variations as above mentioned will provide no difficulty. For example, if a circuit is employed which is so designed as to actuate a relay system in response to the received wave signal of magnitude greater than 1 mV, it can be easily determined whether at least a passenger is present or not in the area defined by an ellipsoid denoted by 1 mV in FIG. 2.

However, for the detection of the number of passengers or persons in the area, the characteristic of the received wave signal as described above is very inconvenient and makes such detection practically impossible. For example, assuming that the voltage which is available from the received wave signal ER when a single person is standing at the position Q is to represent a single person, then the voltage of the received wave signal from a single person at the location P would represent the presence of four or more men. Solution of such a problem is also contemplated by the present invention, according to which the received wave signal is shaped for the purpose of eliminating the influences caused by the variations in the locations of the passengers.

The ultrasonic transmitter-receiver unit constructed on the basis of the two principles, i.e. averaging and shaping of the received wave signal, according to the invention allows a detection of the number of the passengers with a high accuracy. Of course, the invention can be realized based on one of the principles accompanied with corresponding advantages. Particularly, the method based on the last mentioned principle will enhance by itself considerably the detecting accuracy.

Figure 3:
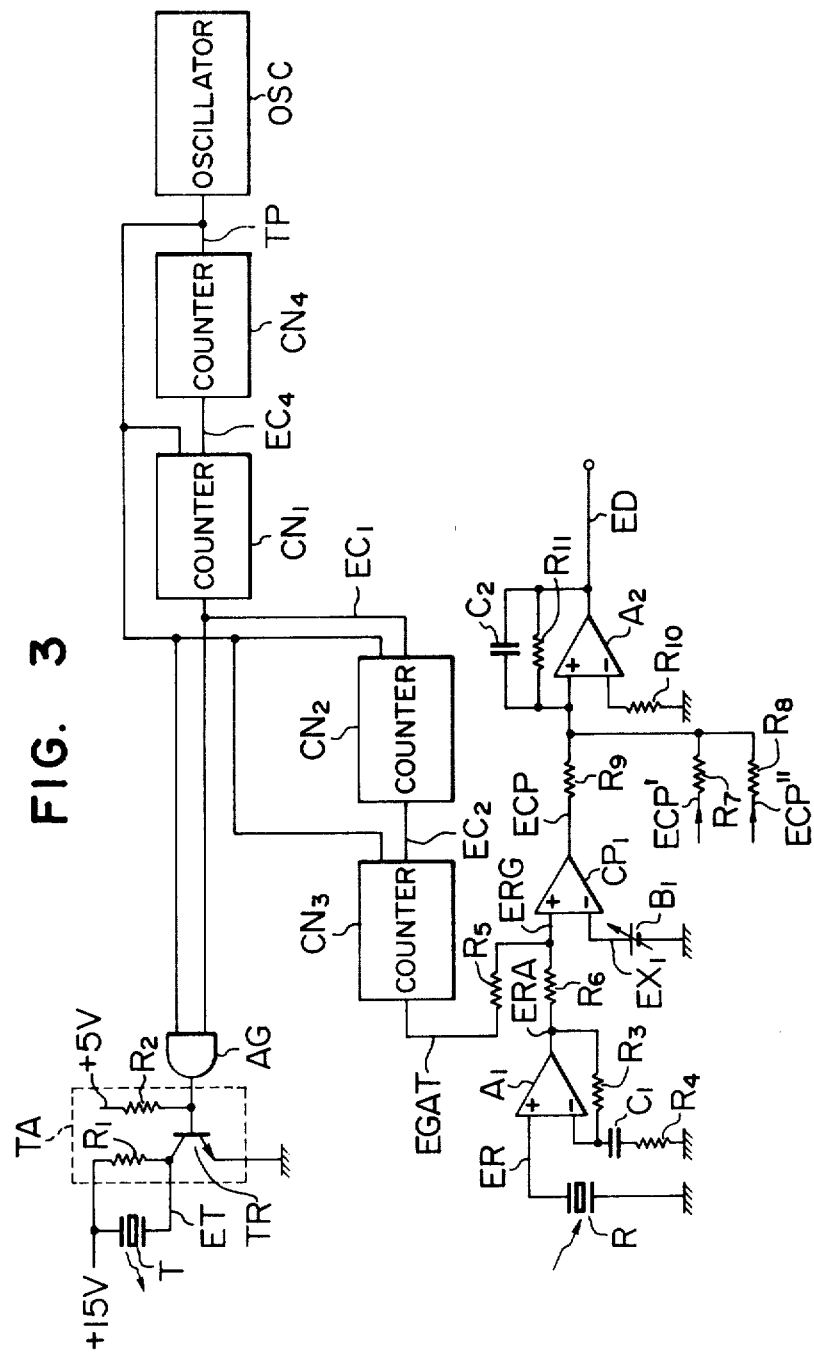
FIG. 3 is a circuit diagram of a number detecting apparatus according to the invention with several components shown in block form.
Figure 4:
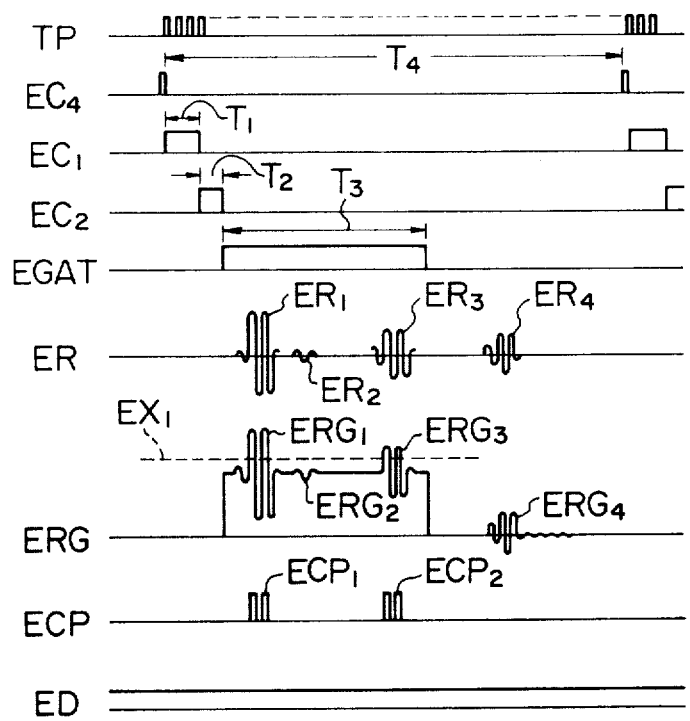
FIG. 4 is a signal wave diagram to illustrate the operation of the circuit shown in FIG. 3.

Now, the description will be made how the above described principles can be implemented in accordance with the invention by referring to FIG. 3 which shows an embodiment of the invention together with FIG. 4 showing various signals produced in the circuit shown in FIG. 3 to illustrate the operations thereof.

In these drawings, the reference symbol OSC designates an oscillator which is adapted to produce clock pulses TP in the ultrasonic frequency range of about 25 kHz. The clock pulses TP are counted by a counter $CN_4$ which in turn produces a counter output signal $EC_4$ with a pulse interval of $T_4$ as can be seen in FIG. 4.

A series of counters $CN_1$, $CN_2$ and $CN_3$ having respective trigger means are also provided which are adapted to start counting the clock pulses TP in response to the trailing edges of the signals $EC_4$, $EC_1$ and $EC_2$, respectively, and stop the counting when predetermined counts are attained. During the counting operation, output signals appear at the respective output $EC_1$, $EC_2$ and EGAT, the periods of which are indicated by $T_1$, $T_2$ and $T_3$ in FIG. 4, respectively. The counter output $EC_1$ is applied to an AND gate AG along with the clock pulse TP, the output from which is amplified by an amplifier circuit TA comprising a transistor TR, resistors $R_1$, $R_2$ and so forth and then fed to the transmitter T as the transmitted wave signal ET. In this manner, the transmitted wave signal ET applied to the ultrasonic wave transmitter T corresponds to the signal portion extracted from the oscillator output of 25 kHz during the period $T_1$. The gate signal EGAT which is the output of the counter $CN_3$ is produced after the termination of the transmitted wave signal ET with a delay corresponding to the period $T_2$ and sustained during the period $T_3$. The gate signal EGAT serves to derive required information from the received wave signal ER, as described hereinafter.

The received wave signal ER produced as the output voltage of the receiver R contains various components such as a reflected wave $ER_1$ from a person standing near the receiver, noise $ER_2$, reflection wave $ER_3$ from a remote passenger and a reflection wave $ER_4$ from walls of the hall.

The received wave signal ER is amplified by a preamplifier $A_1$, the output ERA of which is similar to the signal ER except that the amplitude of the former is greater than that of the latter signal ER. The signal ERA is added to the gate signal EGAT described above to constitute a comparator input ERG which contains signal components $ERG_1$ to $ERG_4$ associated with the reflection waves $ER_1$ to $ER_4$, respectively. The signals $ERG_1$ to $ERG_3$ are leveled up as a whole during the period in which the gate signal EGAT is present, as can be seen in FIG. 4.

The comparator input ERG is compared with a reference voltage $EX_1$ of a reference voltage source $B_1$ at a comparator $CP_1$ which is adapted to produce a constant voltage at the comparison output ECP thereof, when the signal ERG is greater than $EX_1$, i.e. ERG $>EX_1$. The reference voltage $EX_1$ is set at a value which is higher than a normal noise signal $ERG_2$ as is shown in FIG. 4 so that there will appear at the comparator output ECP only the signals $ECP_1$ and $ECP_2$ corresponding, respectively, to the signals $ERG_1$ and $ERG_3$. Since the signal $ERG_4$ corresponding to the reflection signal from the walls is not leveled up by the gate signal EGAT, the signal $ERG_4$ will not appear at the comparator output ECP.

In this way, the noise signal $ER_2$ and the reflection signal $ER_4$ from the walls contained in the received wave signal ER are removed and only the reflection wave signals $ER_1$ and $ER_3$ from the passengers are derived as the comparator output signals $ECP_1$ and $ECP_2$ which have a similar waveform as a result of the wave shaping operation of the comparator, although the magnitudes of the signals $ER_1$ and $ER_3$ are different from each other due to the different locations of the reflecting passengers.

The output signal ECP from the comparator $CP_1$ is applied to an integrating amplifier $A_2$ provided with resistors $R_9$, $R_{10}$, $R_{11}$ and a capacitor $C_2$ and having a sufficiently great time constant. The integrating amplifier $A_2$ thus operates to convert the comparator output ECP successively applied thereto for every unit time into an averaged d.c. component signal and produce an output signal ED successively. In this manner, the ultimate signal ED can take a value proportional to the number of passengers which value is substantially insusceptible to the influences of the fine corporeal motions, various postures and the positions of the passengers. In other words, the signal ED constitutes the detection signal representative of the number of the detected passengers.

When a plurality of receivers are installed, comparator outputs ECP', ECP'', etc. processed in a similar manner as the comparator output ECP are derived from every one of the receivers and applied to the integrating amplifier $A_2$ through associated input resistors $R_7$ and $R_8$, thereby to be added to the comparator output ECP.

FIG. 5 shows graphically the characteristic of the number detection signal ED produced in the manner as described above. The coordinate is plotted in the same dimensions as in the case of FIG. 2.

As will be seen from FIG. 5, the stabilized detection signal voltage of 1 V, for example, can be obtained for each of the passengers over a large elliptical area. When the position of the passenger lies in the vicinity of the remote end of the elliptical area, the reflection wave therefrom and hence the detection signal voltage are decreased. Since in the illustrated embodiment, the period $T_3$ of the gate signal EGAT is so set that the reflection wave from the passenger or any objects distanced from the transmitter-receiver unit greater than 4.5 m is shut off, the detection signal voltage associated with such reflections wave will be zero. Accordingly, there is no danger of the accuracy being degrated by the walls or the like.

FIG. 6 shows a relation between the number of passengers located in the detection area and the detection signal voltage. The number of passengers is taken along the abscissa, while the detection signal voltage is taken along the ordinate.

As can be seen from FIG. 6, the above relation remains in a proportional relation and the detection of the number of persons or passengers can be effected with a good accuracy so long as the number of persons is fewer than about twenty five. When this number is exceeded, the detection signal voltage will begin to be saturated. However, in the range of such large number of persons, the accurate number detection becomes often unnecessary and a mere indication of the presence of a large number of persons will be sufficient for practical purposes in most cases.

As will be understood from the foregoing description, the system according to the invention allows the detection of the number of persons with a very high accuracy. The apparatus for such detection can be constructed inexpensively in a simple manner. When the inventive system is applied to elevator control, for example, the control of the elevator can be effected with a high performance by taking the number of the awaiting passengers at the hall into consideration. Further, the apparatus according to the invention can be easily installed without being restricted by environmental conditions, so that the invention may be employed for various applications and general purposes.

It goes without saying that the invention is not restricted to the embodiment described above. The invention can be embodied in many other configurations, which will be described hereinafter by referring to the drawings.

FIGS. 7 and 8 show another embodiment of the invention. FIG. 7 shows a modification of a portion of the circuit shown in FIG. 3, while FIG. 8 is a signal diagram to illustrate the operation of the circuit of FIG. 7.

It should be recalled that, in the case of the embodiment shown in FIG. 3, the received wave signal ER is added with the gate signal EGAT produced during the time interval or period $T_3$ and thereafter undergoes a wave shaping at the comparator $CP_1$. As is shown in FIG. 4, the reflection wave $ER_1$ from a near person and the reflection wave $ER_3$ from a remote person are different from each other in respect of their peak values. Since the received wave signals are to be derived from both of these reflection waves, it is necessary to set the reference voltage $EX_1$ for comparison at a value lower than the peak value of the reflection wave $ER_3$ having a smaller crest than the wave $ER_1$. However, when the reference voltage $EX_1$ for comparison is selected low, there may arise the possibility of the noise signals from near locations being produced, which is of course undesirable.

The embodiment shown in FIG. 7 is arranged with a view to evading the above described inconvenience. To this end, the difference in the peak values between the received wave signals ER due to the reflections from different locations is compensated before the received wave signals ER are compared with the reference voltage.

Now referring to FIG. 7, a counter $CN_5$ is provided to transmit a signal to a gain signal generator GAIN only during the period $T_5$ (FIG. 8). The counter $CN_5$ may be composed of the combined outputs of the counters $CN_2$ and $CN_3$ shown in FIG. 3, while the period $T_5$ is defined by the sum of the periods $T_2$ and $T_3$ shown in FIG. 4. The gain signal generator GAIN is adapted to produce a gain signal EGAIN of a triangular wave form which is produced after the elapse of the period $T_1$ for the transmitted wave signal ET and is increased linearly during the period $T_5$.

The received wave signal ER, which is detected in the same manner as in the case of the preceeding embodiment, is amplified by an amplifier $A_3$ and appears as the amplified output signal EA. The amplifier $A_3$ is of a variable gain type having a gain proportional to the gain signal EGAIN. In other words, the relation EA$\alpha\lambda$ ER·EGAIN is satisfied. The amplifier $A_3$ thus may be regarded as an analog multiplier for producing the product of the signals ER and EGAIN.

By virtue of the cooperation of the amplifier $A_3$ and the gain signal generator GAIN, the peak values of the signals $EA_1$ and $EA_3$ on the amplifier output EA corresponding, respectively, to the received wave signals $ER_1$ and $ER_3$ become substantially equal to one and the same constant value. The time interval during which the reflection wave $ER_4$ from the remote wall is delayed relative to the period $T_5$. Accordingly, no signal corresponding to the reflection wave $ER_4$ will appear at the amplifier output EA. Owing to such performance, undesired signals due to reflections from the locations outside of the detection area can be eliminated.

The amplifier output EA is supplied to a comparator $CP_2$ and compared with the reference voltage $EX_2$ in a similar manner in the preceeding embodiment, as a result of which only the signal having a greater peak value than the reference voltage $EX_2$ is so wave-shaped as to have a constant peak value and appears as the comparator output E2CP. This output signal E2CP is converted into the number detection signal ED through a smoothing circuit $S_1$ which may be composed of an integrating amplifier $A_2$ as in the case of the preceeding embodiment and has a time constant sufficiently greater than the repetition period $T_4$ of the transmitted wave signal ET. In this manner, the number detection signal ED is available as a d.c. voltage which is equal to the average value of the comparator output signals E2CP.

FIG. 9 shows a relation between the number detection signal ED obtained in the above described manner and the received wave signal ER. In this illustration, it is assumed that a person is located at individual points along the Y-axis. As can be seen from FIG. 9, the number detection signal ED remains substantially constant, even if the received wave signals ER are varied in dependence on the locations of the persons. Further, it is noted that the detection signal is generally insensitive to the influences of the objects located outside the detection area.

FIGS. 10 and 11 show a still another embodiment of the invention. In this embodiment, means is provided to regulate the reference voltage for comparison in consideration of the fact that the peak value of the received wave signal ER is decreased in accordance with the location of the object.

Referring to FIG. 10, the counter $CN_5$ is of the same construction as the one shown in FIG. 7. The reference voltage generator $B_3$ is adapted to respond to the signal from the counter $CN_5$ thereby to produce a reference voltage $EX_3$ for comparison which decreases as a function of time during the period $T_5$ (Refer to FIG. 11).

The comparator $CP_3$ receives at inputs thereof the reference voltage signal $EX_3$ and the received wave signal ER to perform the wave shaping operation in a same manner as in the case of the aforementioned embodiments. The reference voltage signal $EX_3$ in this embodiment is decreased, as time elapses. In this way, the circuit shown in FIG. 10 can positively pick up the received wave signal ER reflected only from the person or passengers without being influenced by the peak value of the received wave signal ER varying in dependence upon the locations of the persons. Furthermore, since the reference voltage signal $EX_3$ takes a high voltage level except for the period $T_5$, the received wave signals due to the reflections from the locations outside the detecting area can be utterly eliminated.

The comparator output E3CP is fed to a smoothing circuit $S_2$ and the number detection signal ED is produced therefrom, as in the case of the embodiments described hereinbefore.

FIGS. 12 and 13 show still another embodiment of the invention, in which the signal of a constant peak value derived after the comparison of the received wave signal ER with a reference voltage $EX_4$ is subjected to the wave shaping operation. As described hereinbefore, the received wave signals ER have different peak or crest values in dependence upon the different locations of the objects of which number is to be detected. Accordingly, when the reference voltage $EX_4$ is set at a high level in an effort to eliminate the noise, the discriminating performance of the comparator $CP_4$ becomes different in dependence upon the locations of the objects. For example, the comparator output $E4CP_1$ responding to the received wave signal $ER_1$ may comprise four pulses, while the output signal $E4CP_3$ corresponding to the received wave signal $ER_3$ comprises two pulses. Accordingly, if the comparator output E4CP is smoothed as it is, errors may be involved in the results of the detection. In view of such observation, the embodiment shown in FIG. 12 is so arranged that the comparators output E4CP is shaped so as to increase the peak value thereof as the associated reflecting object is farther located, whereby the integrated value of the comparator output E4CP is made substantially constant for every received wave signal.

Referring to FIG. 12, the counter $CN_5$ is adapted to transmit a signal to a limit signal generator LIM during the period $T_5$ after the duration $T_1$ for emitting the ultrasonic wave signal. The limit signal generator LIM is so arranged as to generate a voltage which is increased as a function of time during the period $T_5$, as is indicated by the limit signal ELIM in FIG. 13. The output of the generator LIM remains zero except for the period $T_5$.

On the other hand, the comparator $CP_4$ compares the received wave signal ER with the reference voltage $EX_4$ to produce the comparator output E4CP as in the preceeding embodiments.

Diodes $D_1$ and $D_2$ together with a resistor $r$ constitute an amplitude limiter circuit. The voltage +V applied to one end of the resistor $r$ is set at a sufficiently high value as compared with those of the limit signal ELIM and the comparator output signal E4CP. As is well known in the art, with such arrangement, the limiter output S takes a lower value either of the limit signal ELIM or of the comparator output signal E4CP. Since the amplitude of the comparator output signal E4CP is selected greater than that of the limit signal ELIM in this embodiment, the amplitude of the comparator output E4CP is limited by the value of the limit signal ELIM.

The limiter output ES contains signal components $ES_1$ and $ES_2$ corresponding, respectively, to the signals $E4CP_1$ and $E4CP_2$ of the comparator output signal E4CP. The signal $ES_2$ has a greater amplitude than the signal $ES_1$. Since the limit signal ELIM is set at zero except for the period $T_5$ as described above, the received reflection waves from the objects such as wall lying outside the detecting area are thereby removed. As a consequence, no signal corresponding to the signal $E4CP_3$ will appear in the limiter output signal ES.

The limiter output ES is inputted to a smoothing circuit $S_3$ to be outputted as the number detection signal ED. Since the circuit arrangement is made such that the amplitude of the limiter output $ES_2$ having a short pulse duration is increased, the average values of the signals $ES_2$ and $ES_1$ are substantially equal to each other. In this manner, the received wave signal reflected from a distant person or the one from a closer person occurs at the same ratio.

In the foregoing description of the preferred embodiments, the object to be detected has been assumed to be persons, such as passengers. However, it should be appreciated that the invention is not restricted to these embodiments. The invention can be applied to the detection of the number of objects almost any kind. Further, the circuit arrangement according to the invention is by no means restricted to the embodiments described above. Many modifications and variations are possible without departing from the spirit and scope of the invention. For example, in the disclosed embodiment, the comparator output ECP is processed based on analogue technique. However, the signal ECP can be equally processed in a digital manner. Further, combinations of the disclosed plural embodiments are also possible.

What is claimed is:

1. An apparatus for detecting the number of objects comprising first means for emitting an ultrasonic wave signal toward said objects, second means for receiving a reflection wave signal from said objects and converting the latter to a first electric pulsating signal including pulses representative of each of said objects, third means for generating a reference level signal, wave shaping means having respective input terminals connected with said second means and said reference level setting means for producing a second electric pulsating signal including all those pulses of said first electric pulsating signal having peak values higher than said reference level signal to the exclusion of the other pulses of said first electric pulsating signal, and means responsive to said second electric pulsating signal for producing an output signal proportional to the pulses in said second electric pulsating signal.

2. A detecting apparatus according to claim 1 wherein said first means includes generator means for transmitting ultrasonic waves for every unit time, and said second electric pulsating signal is derived from said wave shaping means for every unit time.

3. A detecting apparatus according to claim 2, wherein said means for producing said output signal proportional to the number of said objects comprises means for averaging successively said second electric pulsating signal for said every unit time.

4. A detecting apparatus according to claim 1, wherein said means for producing said signal proportional to the number of said objects receives said second electric pulsating signal only during a predetermined period after the emission of said ultrasonic wave signal by said first means.

5. A detecting apparatus according to claim 1, wherein said apparatus further comprises means for producing a gate pulse signal having a predetermined duration and appearing a predetermined period after the emission of said ultrasonic wave by said first means, said gate signal producing means being connected to that input terminal of said wave shaping means to which said second means is connected for raising the level of at least part of said first electric pulsating signal.

6. A detecting apparatus according to claim 1, wherein said apparatus further comprises amplifier means having a gain which is controlled to increase as a function of time during a predetermined period after the emission of said ultrasonic wave signal by said first means, and wherein said second means is connected to said wave shaping means through said amplifier means.

7. A detecting apparatus according to claim 1, wherein said third means generates a reference voltage signal which is decreased in level as a function of time for a predetermined period after the emission of said ultrasonic wave by said first means.

8. A detecting apparatus according to claim 1, wherein said apparatus further comprises means for producing a limit signal whose level is increased as a function of time during a predetermined period after the emission of said ultrasonic wave signal, and limiter means for modifying said second electric pulsating signal produced by said wave shaping means according to the level of said limit signal.

9. A detecting apparatus according to claim 9, wherein said wave shaping means includes means for transforming the amplitude of said pulses forming said second electric pulsating signal to a constant peak value.

10. A detecting apparatus according to claim 1, wherein said second means comprises a transducer for converting said reflection wave signal to said first electric pulsating signal and an amplifier connected to said transducer, said wave shaping means comprising a comparator having one input connected to the output of said amplifier and a second input connected to the output of said third means, the output of said comparator being applied to the input of said means for producing an output signal.

11. A detecting apparatus according to claim 1, wherein said wave shaping means comprises a comparator, and further comprising signal generator means for generating a limit signal of predetermined duration equal to the period of operation of said second means and having an increasing amplitude with time, and amplitude limiter means connected to the output of said comparator and said signal generator means for applying to said means producing an output signal the signal of lower value as between said limit signal and the pulses of said second electric pulsating signal.

* * * * *